(12) United States Patent
Stone et al.

(10) Patent No.: US 9,490,610 B2
(45) Date of Patent: Nov. 8, 2016

(54) ELECTRICAL ENCLOSURE VOLTAGE PROTECTION SYSTEM

(71) Applicants: Robert Louis Stone, Perry Hall, MD (US); Mohammed Islam, Ellicott City, MD (US); Young Yoo, Glen Burnie, MD (US)

(72) Inventors: Robert Louis Stone, Perry Hall, MD (US); Mohammed Islam, Ellicott City, MD (US); Young Yoo, Glen Burnie, MD (US)

(73) Assignee: POSTIS LLC, Baltimore, MD (US)

( * ) Notice: Subject to any disclaimer, the term of this patent is extended or adjusted under 35 U.S.C. 154(b) by 0 days.

(21) Appl. No.: 14/974,663

(22) Filed: Dec. 18, 2015

(65) Prior Publication Data

US 2016/0181767 A1    Jun. 23, 2016

Related U.S. Application Data

(60) Provisional application No. 62/094,222, filed on Dec. 19, 2014.

(51) Int. Cl.
*G08B 21/00* (2006.01)
*H02B 1/06* (2006.01)
*H02B 1/044* (2006.01)

(52) U.S. Cl.
CPC ............... *H02B 1/06* (2013.01); *H02B 1/044* (2013.01)

(58) Field of Classification Search
CPC .................................................. H02B 1/06

USPC ........ 340/660, 661, 662, 663; 361/1, 20, 23, 361/35

See application file for complete search history.

(56) References Cited

U.S. PATENT DOCUMENTS 4,814,929 A * 3/1989 Ashley .................... H02B 1/42
307/141.4

* cited by examiner

*Primary Examiner* — Jeffery Hofsass
(74) *Attorney, Agent, or Firm* — Ober, Kaler, Grimes & Shriver; Royal W. Craig

(57) ABSTRACT

An electrical isolation apparatus to automatically interrupt main power in advance of its junction to the main electrical panel whenever the main disconnect switch is turned off. A method for retrofitting an existing electrical panel enclosure with an electrical isolation box (EIB) is also disclosed, along with a retrofit kit. The electrical isolation apparatus includes an auxiliary relay resident in the main electrical panel enclosure and actuated by said main disconnect switch. The electrical isolation apparatus also includes the EIB in a second ride-on enclosure attached to the main panel enclosure. The EIB encloses a power contactor with at least one power contactor switch (three for three-phase). The control input of the power contactor is connected through both enclosures to the auxiliary relay resident in the main enclosure for controlling the power contactor. Indicator lights, a voltage monitor, and a reset/test switch panel-mounted on the EIB enclosure are also disclosed for status display. The foregoing avoids any high voltage condition in the main power receptacle after the disconnect is actuated, creating a safer work environment.

21 Claims, 3 Drawing Sheets

ELECTRICAL ENCLOSURE VOLTAGE PROTECTION SYSTEM

CROSS-REFERENCE TO RELATED APPLICATION(S)

The present application derives priority from U.S. provisional patent application No. 62/094,222 filed 19 Dec. 2014.

BACKGROUND OF THE INVENTION

1. Field of the Invention

The present invention relates generally to electrical enclosures.

2. Description of the Background

There are various sizes, shapes, and designs of electrical enclosures. Many electrical enclosures are designed in a manner such that it is impossible to eliminate all high voltage (typically greater than 50V) from the inside of the enclosure without opening a main supply breaker, which can also mean losing power to other equipment. For example, FIG. 1 is a typical electrical enclosure 10 to which a main power supply line feeds into the enclosure 10 and to a Main Power Disconnect 30 located within the enclosure 10. Each motor is controlled by an individual circuit breaker also within the enclosure 10, and external disconnect switches 1-4. Main Power Disconnect 30 is mechanically linked to a manual actuator 40 that locks/unlocks the door. The manual actuator 40 requires the Main Power Disconnect 30 switch to be turned "OFF" before the door of the electrical panel 10 is released to open. With the manual actuator 40 in "OFF", and the door opened, there is still a high voltage potential within the electrical panel enclosure 10, accessible to human hands or tools or others, at the terminals of the Main Power Disconnect 30. Additionally, if one or more of the contacts of the Main Power Disconnect 30 have failed and it remains shut (ex, welded) despite the manual actuator 40 being in "OFF", there is still high voltage within the electrical panel enclosure, and in this latter case it is unknown to the technician. Unless it is somehow possible to turn off main power before it enters the electrical enclosure 10, work cannot be performed on/in the electrical enclosure 10 without an inherent high voltage condition. OSHA requires the use of electrical safety precautions for work in the vicinity of energized gear. Work in the vicinity of energized gear, even with electrical safety equipment, still presents a level of risk, but to use all this equipment in practice requires significantly more time, cost, and equipment.

Some business, such as the U.S. Postal Service has a significant quantity of electrical enclosures designed in this manner. In adherence of electrical safety precautions, as practice they use additional electrical safety equipment (e.g., face shields, safety glasses, rubber gloves, rubber matting, coveralls, etc.). This equipment is expensive and because of sizes, companies may be required to have many sets. Further, it requires significantly more time to work on equipment, which may sometimes only be a very quick task. Employees may also, in an effort to complete their work task quickly, violate policy of using electrical safety equipment and put themselves at risk.

It would be greatly advantageous to provide an improved electrical enclosure that avoids the above-described high voltage condition, as well as a retrofit method for modifying an existing electrical enclosure as above with a low cost easy to install kit, which will eliminate the high voltage condition, creating a safer work environment for many companies, including the U.S Postal Service.

SUMMARY OF THE INVENTION

It is an object of the invention to provide a method to modify typical electrical enclosure in a manner that will eliminate power within the electrical enclosure.

It is another object to provide a voltage detection system in order to sense the voltage within the electrical enclosure if dissipated.

In accordance with the foregoing objects, the present invention is a method for retrofitting an existing electrical panel enclosure (of a type having a power disconnect switch) with an electrical isolation apparatus to automatically interrupt main power in advance of its junction to the main electrical panel whenever the main disconnect switch is turned off. The invention also comprises the electrical isolation apparatus itself and the method for retrofitting an existing electrical panel enclosure with the electrical isolation apparatus of the invention.

The electrical isolation apparatus includes an auxiliary relay resident in the main electrical panel enclosure and actuated by said main disconnect switch. In addition, the electrical isolation apparatus comprises a second ride-on enclosure attached to the existing electrical panel enclosure, and a power contactor resident in the second enclosure and having at least one power contactor switch (three for three-phase power) selectively interrupting main power in the ride-on enclosure before it reaches the main electrical panel. The control input of the power contactor is connected through both enclosures to the auxiliary relay resident in the first enclosure for controlling the power contactor. Indicator lights, a voltage monitor, and a reset/test switch may be panel-mounted on the ride-on enclosure for status display. The foregoing avoids any high voltage condition in the main power receptacle after the disconnect is actuated, creating a safer work environment for many companies and particularly the U.S. Postal Service.

The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENT

Reference will now be made in detail to preferred embodiments of the present invention, examples of which are illustrated in the accompanying drawings. Where the same reference numbers are used throughout the drawings they refer to the same or like parts.

Figure 1:
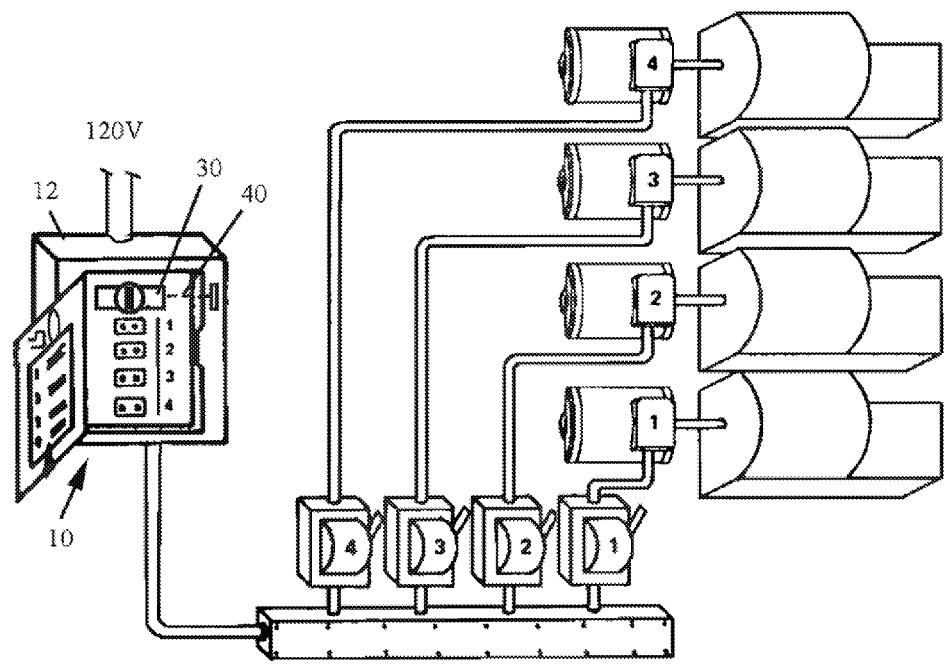
FIG. 1 is a typical (prior art) electrical enclosure 10, showing the power supply voltage to the Main Power Disconnect 30, which is within the enclosure 10.

The present invention is an Electrical Isolation Box (EIB) 50 that is preferably provided as a retrofit to a typical electrical power enclosure 10 as described above with reference to FIG. 1 to improve safety and reduce the cost of accessing the existing power enclosures 10. However, one skilled in the art will readily understand that the EIB 50 may alternatively be provided as an original equipment integral to an electrical power enclosure 10 without departing from the scope or spirit of the invention. A method of retrofitting a typical electrical power enclosure 10 as described above with EIB 50 is also disclosed.

Figure 2:
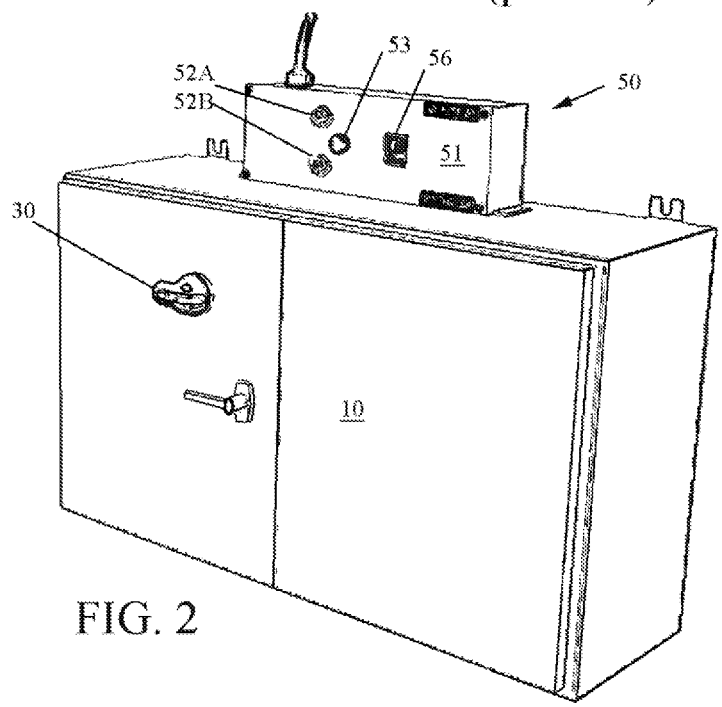
FIG. 2 is a perspective view of the EIB 50 according to the present invention, fitted to an otherwise standard electrical power enclosure 10 as in FIG. 1.

FIG. 2 is a perspective view of the EIB 50 fitted to an otherwise standard electrical power enclosure 10. EIB 50 generally comprises a rectangular enclosure 51 attached atop the power enclosure 10. A pair of front panel-mounted indictor lights 52 include a red "electrical panel energized" indicator light 52A and a green "electrical panel de-energized" indicator light 52B. A detent-type Reset/Test switch 53 is panel-mounted next to the indicator lights 52, and a Voltage Monitor and Display Panel 56 is mounted proximate the Reset/Test switch 53. The Voltage Monitor and Display Panel 56 is a commercially-available line voltage monitor.

The power supply lines (line side) are terminated within the EIB enclosure 51, and are connected to a power contactor 54 internal to the EIB 50 (to be described). Power contactor 54 is a commercially-available component comprising an electrically-controlled switch similar to a relay except with higher current ratings. The load side of the power contactor 54 is then connected to the line side of the main disconnect 30. The control input to power contactor 54 is electrically linked to the main disconnect 30 so that when the main disconnect 30 switch is turned to "OFF", the power contactor 54 is allowed to open (OFF). When the power contactor 54 is open, the high voltage power supply lines (line side) are isolated inside the EIB 50 and outside of the main electrical panel enclosure 10, thereby eliminating its high voltage condition in the main electrical panel enclosure 10. In use, a technician turns main disconnect 30 to "OFF", which signals the control input to power contactor 54 to automatically disconnects power at the EIB 50 outside of the main electrical panel 10. This turns off the red "electrical panel energized" indicator light 52A and illuminates the green "electrical panel de-energized" indicator light 52B. In addition, the Voltage Monitor and Display Panel 54 changes its readout from line voltage to 0 volts. The technician is then free to perform maintenance activity without special high0-voltage condition precautions. With EIB 50 in place, the technician can freely open the front door disconnect of the main electrical panel 10 and gain access to the enclosure safely, without the protective gear and safety precautions currently required to work in the vicinity of energized gear. When the work is complete, the technician turns main disconnect 30 to "ON" and presses the "RESET/Test" button 53 on EIB 50, which signals the control input to power contactor 54 to reconnects power and restore line voltage.

Figure 3:
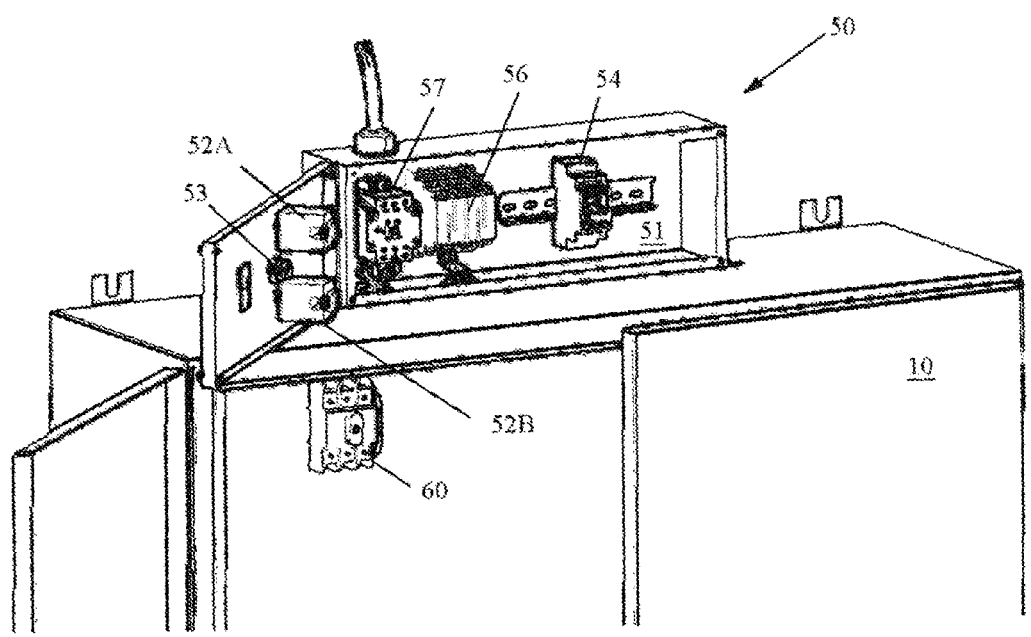
FIG. 3 is a front view of the EIB 50 and main electrical panel 10 with front doors open to reveal interior components.

FIG. 3 is a front view of the EIB 50 and main electrical panel 10 with front doors open to reveal interior components. The components inside EIB 50 include red "electrical panel energized" indicator light 52A, green "electrical panel de-energized" indicator light 52B, detent-type Reset/Test switch 53, Voltage Monitor and Display Panel 56, and power contactor 54. In addition, a high power terminal connector block 57 is mounted for convenient connection of the components of EIB 50 to the power lines as will be described. The present invention also requires retrofit installation of an auxiliary contact 60 (to be described) onto the existing disconnect switch 30 in main electrical panel 10. Thus, in order to install/retrofit an EIB 50 to the main electrical panel enclosure 10, the following steps are taken:

Step 1: Disconnect and remove power cord from existing Power Enclosure.

Step 2: Cut a hole into the top of existing rectangular enclosure 51 (a template will be provided for this).

Step 3: Mount the EIB 50 on top of existing main electrical panel 10, aligning it with the hole from step 1.

Step 4: Install an auxiliary contact 60 (from kit) onto existing disconnect switch 30 in main electrical panel 10. An auxiliary contact is a commercially-available secondary switching device that works in conjunction with primary switching equipment (e.g., main disconnect 30). The auxiliary contact 60 is physically linked to the main disconnect 30 and activates at the same time it does. There are a variety of suitable auxiliary contacts 60 commercially available from, for example SquareD®, depending on power requirements. They are designated by a letter followed by a three digit number, the letter designates the current rating of the contacts and the current type (i.e., AC or DC) and the number designates the maximum voltage.

Step 5: Connect EIB 50 to main electrical panel 10. This entails connecting power conductors from the load side of the power contactor 54 to the line side of the main disconnect 30, and connecting a sensing cable between auxiliary contact 60 and EIB 50.

Step 6: Connect power cord to EIB 50. The power supply lines (line side) are terminated within the EIB enclosure 51 at terminal block 57, which is in turn connected to the line side of power contactor 54 internal to the EIB 50. The installation is complete.

Figure 4:
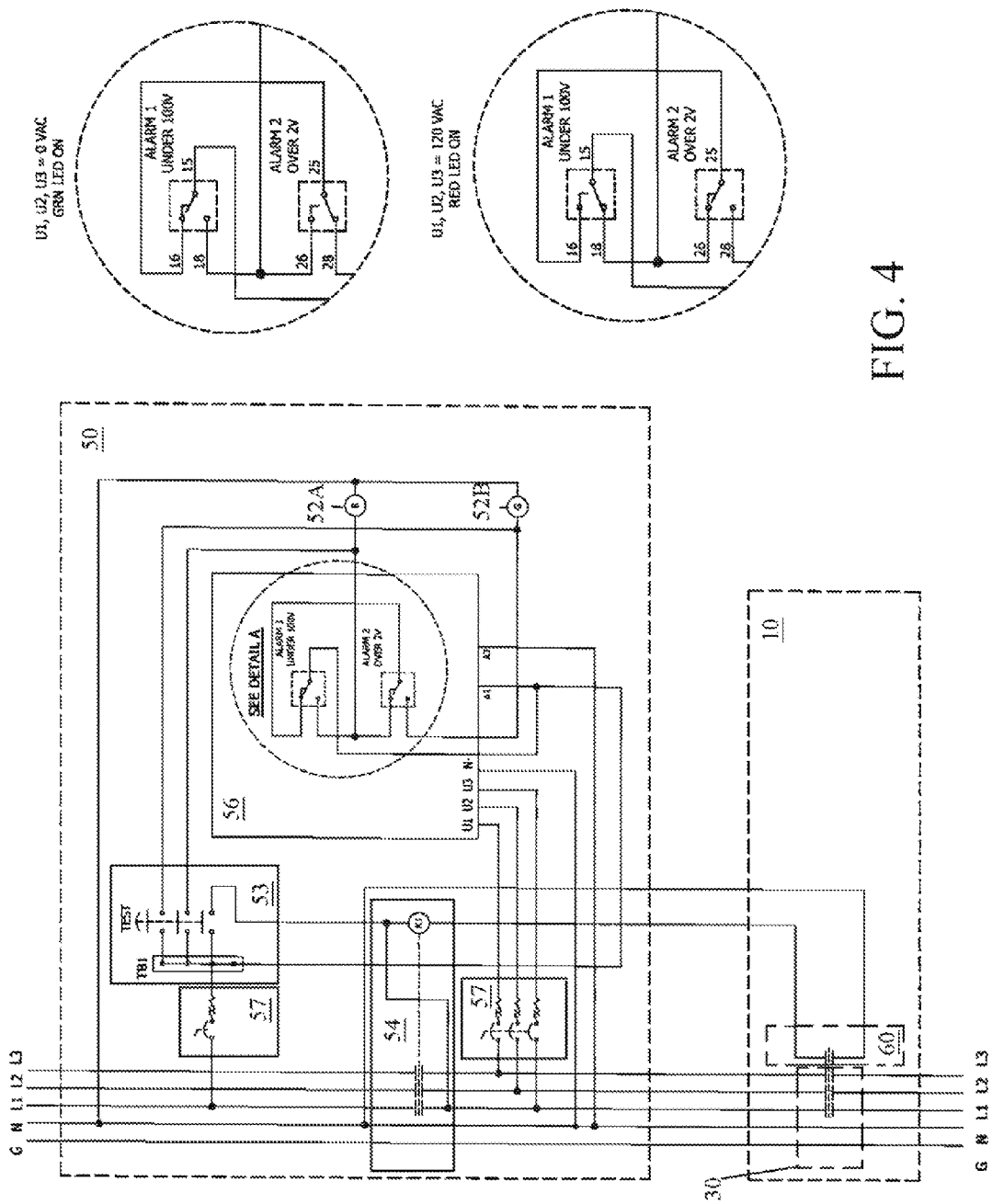
FIG. 4 is an electrical schematic showing the internal connections and components of the EIB 50 and main electrical panel 10.

FIG. 4 is an electrical schematic of the above modification showing EIB 50 connected to the main electrical panel 10. The configuration of FIG. 4 is designed for 3-phase, 220V AC and 30A, the most common application within US Postal Service. However, one skilled in the art will appreciate that other configurations are possible for higher current and/or voltage ratings. At bottom, the main electrical panel 10 contains the existing three-phase main disconnect 30, and the auxiliary contact 60 has been installed to essentially serve as a fourth relay controlled by the main disconnect 30. Thus, when the main disconnect 30 is opened the auxiliary contact 60 likewise opens, and vice versa. One side of auxiliary contact 60 is connected to neutral (N) and the other is connected to the control input K of the power contactor 54 internal to the EIB 50. The infeed and load sides of the power contactor 54 are connected in line with three-phase power lines L1-L3 as shown so that when the main disconnect 30 switch is turned to "OFF", the power contactor 54 disconnects three-phase power lines L1-L3 (OFF) inside the EIB 50. The Voltage Monitor and Display Panel 56 is connected to three-phase power lines L1-L3 through terminal connector block 57 as shown and displays the line voltage of the three-phase power lines L1-L3. One skilled in the art will understand that Voltage Monitor and Display Panel 56 may comprise a programmable alarms, but for present purposes a power-off overvoltage alarm threshold and a power-on undervoltage threshold are preferred. Thus, for 3-phase 220V AC and 30A, for example, when power is off a power-off overvoltage alarm threshold of 2V is preferred, such that Voltage Monitor and Display Panel 56 signals an alarm when power is supposed to be off but exceeds the over-voltage alarm threshold of 2V. Conversely, the Voltage Monitor and Display Panel 56 signals an alarm when power is supposed to be on but is below the under-voltage alarm threshold of 100V. The alarms may be sounded and/or displayed directly by the Voltage Monitor and Display Panel 56, but are also visible by the red "electrical panel energized" indicator light 52A, and green "electrical panel de-energized" indicator light 52B. The indicator lights 52 are connected to Voltage Monitor and Display Panel 56 as shown, and to Reset/Test switch 53. The equivalent circuit for the Voltage Monitor and Display Panel 56 is shown in the dotted circle to illustrate that when the power is OFF the green "electrical panel de-energized" indicator light 52B will illuminate, but if line voltage exceeds the power-off overvoltage alarm threshold of 2V, the green "electrical panel de-energized" indicator light 52B extinguishes. Conversely, when the power is ON the red "electrical panel de-energized" indicator light 52A will illuminate, but if line voltage is less than the power-on undervoltage alarm threshold of 100V, the red indicator light 52A extinguishes. Consequently, the technician always can discern if one or more of the contacts of the Main Power Disconnect 30 have failed and it remains shut (ex, welded) despite the manual actuator 40 being in "OFF, or vice versa.

The indicator lights 52 have TEST switch 53 to test the lights are functioning correctly. Alternately, the Voltage Monitor and Display Panel 56 can control a latch mechanism that will prevent the EIB 50 door from being opened unless 0V is detected on the load side.

One skilled in the art will readily understand that the above-described EIB 50 is readily configurable for higher current and/or voltage ratings.

What is claimed is:

1. An electrical isolation apparatus electrically connected to a main electrical panel of a type having a first enclosure and a main power disconnect switch mounted on said first enclosure, said electrical isolation apparatus adapted to automatically interrupt main power in advance of a junction to said main electrical panel whenever said main disconnect switch is turned off, the electrical isolation apparatus comprising:
   an auxiliary relay resident in said first enclosure and actuated by said main disconnect switch;
   a second enclosure;
   a power contactor resident in said second enclosure and having at least one power contactor switch selectively interrupting said main power before said junction to said main electrical panel, and a control input connected to said auxiliary relay resident in said first enclosure for controlling said at least one power contactor switch.

2. The electrical isolation apparatus according to claim 1, wherein said second enclosure is configured to be supported by said first enclosure.

3. The electrical isolation apparatus according to claim 1, further comprising a first indicator light for indicating when said main power is off inside said main electrical panel.

4. The electrical isolation apparatus according to claim 3, further comprising a second indicator light for indicating when said main power is on inside said main electrical panel.

5. The electrical isolation apparatus according to claim 1, further comprising a voltage monitor panel-mounted on said second enclosure for indicating volts of said main power inside said main electrical panel.

6. The electrical isolation apparatus according to claim 4, further comprising a voltage monitor panel-mounted on said second enclosure for indicating volts of said main power inside said main electrical panel.

7. The electrical isolation apparatus according to claim 6, wherein said voltage monitor comprises an overvoltage alarm.

8. The electrical isolation apparatus according to claim 7, wherein said voltage monitor comprises an undervoltage alarm.

9. The electrical isolation apparatus according to claim 8, further comprising a reset/test switch for testing said first and second indicator lights.

10. A method for retrofitting a main electrical panel of a type having a first enclosure and a main power disconnect switch mounted on said first enclosure with an electrical isolation apparatus for automatically interrupt main power in advance of a junction to said main electrical panel whenever said main disconnect switch is turned off, comprising the steps of:
    disconnecting main power from said main electrical panel;
    cutting a hole into said main electrical panel;
    mounting said electrical isolation apparatus proximate said main electrical panel;
    installing an auxiliary relay in said first enclosure for actuation by said main disconnect switch;
    connecting said auxiliary relay through said hole to a control input of power contactor resident in said second enclosure;
    connecting said main power to a pole of a relay of said power contactor in said second enclosure;
    connecting said main power from another pole of said relay of said power contactor in said second enclosure through said hole to said main electrical panel; and
    reconnecting power.

11. The method according to claim 10, wherein said step of mounting said electrical isolation apparatus proximate said main electrical panel comprises attaching said electrical isolation apparatus atop said main electrical panel.

12. The method according to claim 10, wherein said main power is three-phase.

13. A retrofit kit for retrofitting an existing main electrical panel of a type having a first enclosure and a main power disconnect switch mounted on said first enclosure, with an electrical isolation apparatus adapted to automatically interrupt main power in advance of a junction to said main electrical panel whenever said main disconnect switch is turned off, the retrofit kit comprising:
    an auxiliary relay configured for installation in said first enclosure for actuation by said main disconnect switch; and
    an electrical isolation apparatus further comprising,
       a second enclosure;
       a power contactor resident in said second enclosure and having at least one power contactor switch selectively interrupting said main power before said junction to said main electrical panel, and a control input connected to said auxiliary relay resident in said first enclosure for controlling said at least one power contactor switch.

14. The retrofit kit according to claim 13, wherein said second enclosure is configured to be supported by said first enclosure.

15. The retrofit kit according to claim 13, wherein said electrical isolation apparatus further comprises a first indicator light for indicating when said main power is off inside said main electrical panel.

16. The retrofit kit according to claim 15, wherein said electrical isolation apparatus further comprises a second indicator light for indicating when said main power is on inside said main electrical panel.

17. The retrofit kit according to claim 13, wherein said electrical isolation apparatus further comprises a voltage monitor panel-mounted on said second enclosure for indicating volts of said main power inside said main electrical panel.

18. The retrofit kit according to claim 16, wherein said electrical isolation apparatus further comprising further comprises a voltage monitor panel-mounted on said second enclosure for indicating volts of said main power inside said main electrical panel.

19. The retrofit kit according to claim 18, wherein said voltage monitor comprises an overvoltage alarm.

20. The retrofit kit according to claim 19, wherein said voltage monitor comprises an undervoltage alarm.

21. The retrofit kit according to claim 20, wherein said electrical isolation apparatus further comprising further comprises a reset/test switch for testing said first and second indicator lights.

* * * * *